(12) United States Patent
Prieditis et al.

(10) Patent No.: US 12,551,248 B2
(45) Date of Patent: Feb. 17, 2026

(54) SURGICAL DEVICES FOR APPLYING COMPRESSION WITHIN OR ACROSS JOINTS

(71) Applicant: ARTHREX, INC., Naples, FL (US)

(72) Inventors: Maris V. Prieditis, Naples, FL (US); Darren Thomsen, Naples, FL (US)

(73) Assignee: ARTHREX, INC., Naples, FL (US)

( * ) Notice: Subject to any disclaimer, the term of this patent is extended or adjusted under 35 U.S.C. 154(b) by 339 days.

(21) Appl. No.: 18/082,671

(22) Filed: Dec. 16, 2022

(65) Prior Publication Data

US 2024/0197371 A1    Jun. 20, 2024

(51) Int. Cl.
*A61B 17/72* (2006.01)
*A61B 17/00* (2006.01)

(52) U.S. Cl.
CPC ...... *A61B 17/7241* (2013.01); *A61B 17/7225* (2013.01); *A61B 2017/00867* (2013.01)

(58) Field of Classification Search
CPC ............ A61B 17/7241; A61B 17/7275; A61B 17/7216; A61B 17/7225; A61B 2017/00867
See application file for complete search history.

(56) References Cited

U.S. PATENT DOCUMENTS

| | | | |
|---|---|---|---|
| 8,491,583 B2 | 7/2013 | Gall et al. | |
| 10,058,337 B2 * | 8/2018 | Feibel | A61B 17/1775 |
| 10,307,190 B2 | 6/2019 | Garlock et al. | |
| 10,617,453 B2 * | 4/2020 | Beckett | A61B 17/7233 |
| 11,000,319 B2 | 5/2021 | Garlock et al. | |
| 11,737,787 B1 * | 8/2023 | Chevalier | G16H 40/67 |
| | | | 606/258 |
| 2008/0269751 A1 * | 10/2008 | Matityahu | A61B 17/7283 |
| | | | 606/301 |
| 2010/0016889 A1 * | 1/2010 | Ferree | A61F 2/0063 |
| | | | 606/228 |
| 2011/0060336 A1 * | 3/2011 | Pool | A61B 17/1725 |
| | | | 606/62 |
| 2014/0243825 A1 | 8/2014 | Yapp et al. | |

(Continued)

FOREIGN PATENT DOCUMENTS

| | | |
|---|---|---|
| AT | 402009 B | 1/1997 |
| CN | 108309423 A | 7/2018 |

(Continued)

OTHER PUBLICATIONS

International Search Report and Written Opinion of the International Searching Authority for International application No. PCT/US2023/079722 dated May 22, 2024.

(Continued)

*Primary Examiner* — Eduardo C Robert
*Assistant Examiner* — Holly Joanna Lane
(74) *Attorney, Agent, or Firm* — Carlson, Gaskey & Olds, P.C.

(57) ABSTRACT

Surgical devices for performing orthopedic surgeries are provided and are capable of generating and applying compression within or across a joint. The surgical devices may include a slider assembly that includes at least one slider configured to move within an outer body. A ring may be disposed about the slider for reducing contact between the slider and the outer body, thereby improving the wear characteristics of the surgical device.

19 Claims, 5 Drawing Sheets

(56) References Cited

U.S. PATENT DOCUMENTS

| | | |
|---|---|---|
| 2016/0262799 A1 | 9/2016 | Hunziker |
| 2017/0296241 A1* | 10/2017 | Garlock .............. A61B 17/7241 |
| 2021/0038269 A1 | 2/2021 | Kearns |
| 2021/0085373 A1* | 3/2021 | Mueller .............. A61B 17/7037 |
| 2021/0137564 A1 | 5/2021 | Sharifi-Mehr et al. |
| 2021/0259751 A1 | 8/2021 | Garlock et al. |
| 2022/0008102 A1 | 1/2022 | Charest et al. |
| 2022/0015811 A1* | 1/2022 | Lopez Camacho ........................... A61B 17/7216 |
| 2022/0226033 A1 | 7/2022 | Slocum et al. |
| 2022/0378484 A1 | 12/2022 | Sommers et al. |

FOREIGN PATENT DOCUMENTS

| | | |
|---|---|---|
| FR | 2237609 A1 | 2/1975 |
| FR | 2726460 A1 | 5/1996 |
| WO | 2006090380 A2 | 8/2006 |
| WO | 2011116773 A1 | 9/2011 |
| WO | 2020176874 A1 | 9/2020 |

OTHER PUBLICATIONS

International Preliminary Report on Patentability for International application No. PCT/US2023/079722 dated Jun. 26, 2025.

* cited by examiner

SURGICAL DEVICES FOR APPLYING COMPRESSION WITHIN OR ACROSS JOINTS

BACKGROUND

This disclosure relates to the field of orthopedic surgery, and more particularly to surgical devices for generating and applying compression within or across a joint.

Arthrodesis procedures are common in the field of orthopedic surgery for repairing arthritic and/or deteriorated bones. The success of these surgical procedures often depends on successfully approximating bones and on the amount of compression achieved between the bones.

Intramedullary devices can be used during arthrodesis procedures. These devices are designed to reduce and create a compressive load between bones.

SUMMARY

This disclosure relates to surgical devices, such as arthrodesis devices including intramedullary nails, for performing surgical procedures within human or animal bodies. The surgical devices described herein may be capable of bringing bones or bone fragments in proximity to one another, generating a compressive load, and maintaining the compressive load for a prolonged period of time while healing occurs.

An exemplary surgical device may include, inter alia, a nail body extending along a longitudinal axis between a proximal portion and a distal portion, and a slider assembly including a proximal slider located within the proximal portion, a distal slider located within the distal portion, and a Nitinol rod connected to both the proximal slider and the distal slider. A first ring is received within a first indented section of the proximal slider, and a second ring is received within a second indented section of the distal slider. The proximal slider and the distal slider are composed of a metallic material, and the first ring and the second ring are composed of a thermoplastic material.

Another exemplary surgical device may include, inter alia, an outer body, a first slider received within the outer body, and a first ring disposed about the first slider and configured to reduce contact between the first slider and the outer body.

DETAILED DESCRIPTION

This disclosure describes exemplary surgical devices, such as arthrodesis devices including intramedullary nails, for performing surgical procedures (e.g., arthrodesis or fusion procedures, etc.) within human or animal bodies. The surgical devices described herein are capable of bringing bones or bone fragments in proximity to one another, generating a compressive load, and maintaining the compressive load for a prolonged period of time while healing occurs. The surgical devices are further capable of reducing certain wear characteristics associated with movable subcomponents of the surgical devices.

A surgical device may include, inter alia, a nail body extending along a longitudinal axis between a proximal portion and a distal portion, and a slider assembly including a proximal slider located within the proximal portion, a distal slider located within the distal portion, and a Nitinol rod connected to both the proximal slider and the distal slider. A first ring is received within a first indented section of the proximal slider, and a second ring is received within a second indented section of the distal slider. The proximal slider and the distal slider are composed of a metallic material, and the first ring and the second ring are composed of a thermoplastic material.

In a further embodiment, the metallic material includes titanium, and the thermoplastic material includes polyether ether ketone (PEEK).

In a further embodiment, the first ring circumscribes a cylindrical surface of the first indented section, and the second ring circumscribes a cylindrical surface of the second indented section.

In a further embodiment, an outer diameter of the first ring is larger than an outer diameter of the proximal slider at a location adjacent to the first indented section, and an outer diameter of the second ring is larger than an outer diameter of the distal slider at a location adjacent to the second indented section.

In a further embodiment, at least a portion of the proximal slider and the distal slider includes a wear reducing coating.

Another surgical device may include, inter alia, an outer body, a first slider received within the outer body, and a first ring disposed about the first slider and configured to reduce contact between the first slider and the outer body.

In a further embodiment, the first slider includes a first material, and the first ring includes a second material that is different from the first material.

In a further embodiment, the first material is a metallic material, and the second material is a thermoplastic material.

In a further embodiment, the metallic material includes titanium, and the thermoplastic material includes polyether ether ketone (PEEK).

In a further embodiment, a shape memory material connecting member is connected to the first slider.

In a further embodiment, the shape memory material connecting member is a Nitinol (NiTi) rod.

In a further embodiment, a second slider is received within the outer body, and the shape memory material connecting member is connected to the second slider.

In a further embodiment, a second ring is disposed about the second slider and is configured to reduce contact between the second slider and the outer body.

In a further embodiment, the first ring is received about an indented section of the slider.

In a further embodiment, the first ring circumscribes a cylindrical surface of the indented section.

In a further embodiment, the first ring includes an outer diameter that is larger than an outer diameter of the first slider.

In a further embodiment, a tensioning device is connected to the first slider.

In a further embodiment, the tensioning device is a cable received through a transverse passageway of the first slider.

In a further embodiment, the outer body is connectable to a targeting guide that includes a targeting arm having a hub.

In a further embodiment, the targeting guide includes a rotation arrestor having a retaining button, and a spring loaded wedge is configured to selectively engage the retaining button.

Figure 1:
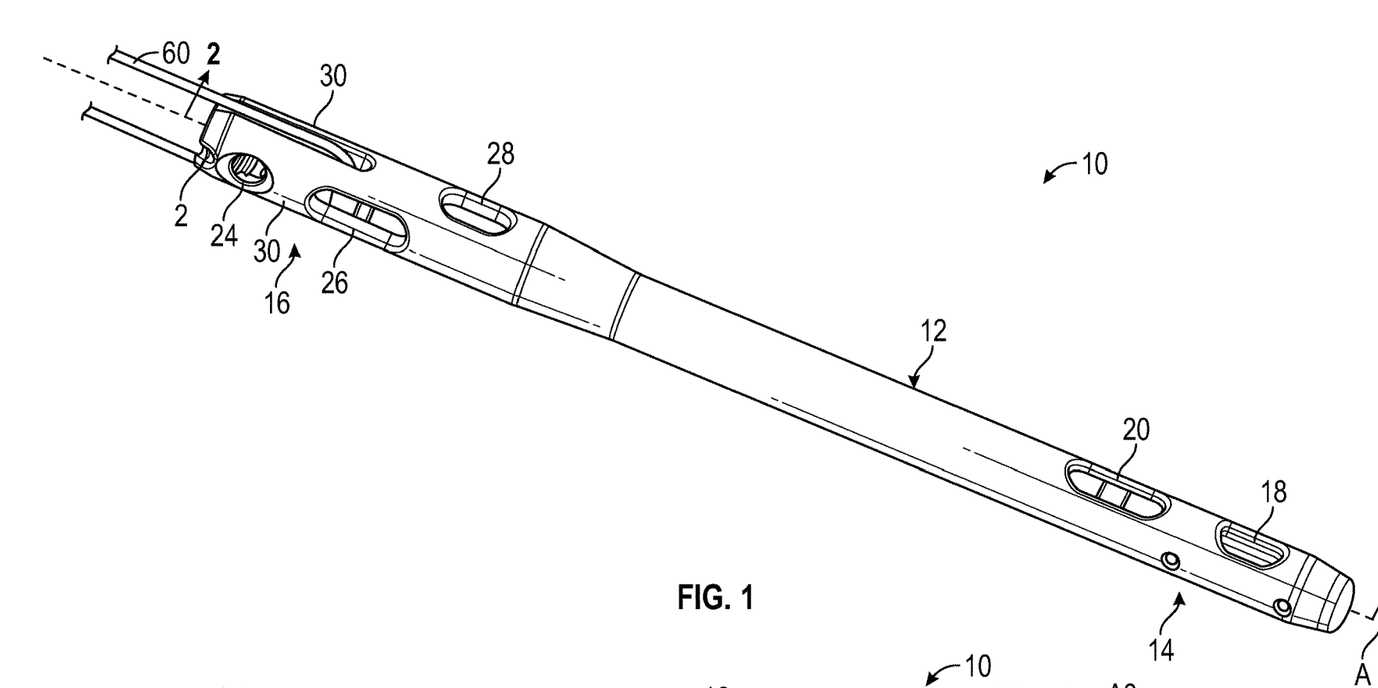
FIG. 1 illustrates a surgical device that includes a slider assembly.
Figure 2:
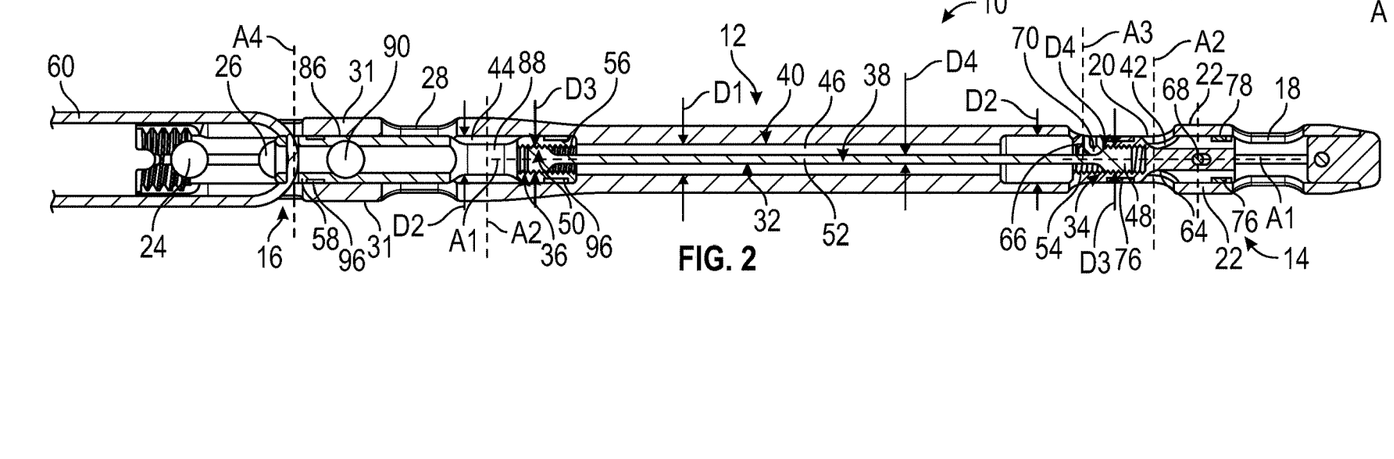
FIG. 2 is a cross-sectional view through section 2-2 of the surgical device of FIG. 1.

FIGS. 1 and 2 illustrate an exemplary surgical device 10 capable of applying compression within or across a joint, such as joint of the human musculoskeletal system. In an embodiment, the surgical device 10 is an arthrodesis device, such as an intramedullary nail. However, other surgical devices, including trauma repair devices, are contemplated within the scope of this disclosure.

The surgical device 10 may include an outer body 12 that extends along a longitudinal axis A between a proximal portion 14 and a distal portion 16. In some implementations, the outer body 12 may be referred to as a nail body.

The outer body 12 may be configured as a sleeve for housing various subcomponents of the surgical device 10. In an embodiment, the outer body 12 is made of a titanium alloy, such as Ti-6Al-4V, for example. However, other materials are also contemplated within the scope of this disclosure.

The outer body 12 may include multiple openings for receiving fixation devices, such as screws, pegs, etc., for fixating the surgical device 10 relative to one or more bones of a joint. For example, the proximal portion 14 of the outer body 12 may include a first proximal opening 18 and a second proximal opening 20 that is slightly distal (e.g., displaced in a direction toward the distal portion 16) to the first proximal opening 18. Each of the first proximal opening 18 and the second proximal opening 20 may receive a screw (not shown) or other fastener for fixating the surgical device 10 to one or more bones.

In an embodiment, the first proximal opening 18 and the second proximal opening 20 are both elongated openings. However, in another embodiment, one or both of the first proximal opening 18 and the second proximal opening 20 could be a round opening.

In an embodiment, the first proximal opening 18 and the second proximal opening 20 extend through diametrically opposed surfaces 22 of the proximal portion 14 of the outer body 12. The first proximal opening 18 and the second proximal opening 20 may therefore each extend along an axis that is about perpendicular to the longitudinal axis A. In this disclosure, the term "about" means that expressed quantities or ranges need not be exact but may be approximated and/or larger or smaller, reflecting acceptable tolerances, conversion factors, measurement error, etc.

The distal portion 16 of the outer body 12 may include a first distal opening 24, a second distal opening 26, and a third distal opening 28. The second distal opening 26 may be just proximal of the first distal opening 24 (e.g., displaced in a direction toward the proximal portion 14), and the third distal opening 28 may be just proximal to the second distal opening 26. The first, second, and third distal openings 24, 26, 28 may each receive a screw (not shown) or other fastener for fixating the surgical device 10 to one or more bones.

In an embodiment, the first distal opening 24 is a round opening and the second and third distal openings 26, 28 are elongated openings. However, other configurations are possible within the scope of this disclosure.

The first and second distal openings 24, 26 may extend through diametrically opposed surfaces 30 of the distal portion 16 of the outer body 12 and may extend along axes that are about perpendicular to the longitudinal axis A. The third distal opening 28 may extend through diametrically opposed surfaces 31 of the distal portion 16 of the outer body 12 and may extend along an axis that is about perpendicular to the longitudinal axis A.

In the illustrated embodiment, the first proximal opening 18, the second proximal opening 20, and the third distal opening 28 extend through the outer body 12 along axes that are parallel to one another. Further, the first and second distal openings 24, 26 may extend along axes that are about perpendicular to the first proximal opening 18, the second proximal opening 20, and the third distal opening 28. However, a person of ordinary skill in the art having the benefit of this disclosure would understand that the locations of the various fastener receiving openings of the outer body 12 may be modified to achieve any desired design intent.

As best illustrated by the cross-sectional view of FIG. 2, the outer body 12 of the surgical device 10 may house a slider assembly 32. The slider assembly 32 may be housed within an internal bore 40 of the outer body 12. The slider assembly 32 may include a proximal slider 34, a distal slider 36, and a shape memory material connecting member 38. Although two sliders are shown as being part of the exemplary slider assembly 32, a person of ordinary skill in the art having the benefit of this disclosure would understand that single slider implementations are also possible within the scope of this disclosure.

The proximal slider 34 may be movably received within a proximal section 42 of the internal bore 40 and may be at least partially exposed within the second proximal opening 20, the distal slider 36 may be movably received within a distal section 44 of the internal bore 40 and may be at least partially exposed within the second and third distal openings 26, 28, and the shape memory material connecting member 38 may be accommodated within a mid-section 46 of the internal bore 40.

The mid-section 46 may extend from the proximal section 42 to the distal section 44 of the internal bore 40. The mid-section 46 may include a first diameter D1 that is smaller than a second diameter D2 of the proximal section 42 and the distal section 44.

In an embodiment, the shape memory material connecting member 38 includes a first threaded portion 48, a second threaded portion 50, and a shaft 52 extending between the first threaded portion 48 and the second threaded portion 50. In an embodiment, the first threaded portion 48 and the second threaded portion 50 include a diameter D3 that is larger than a diameter D4 of the shaft 52. The first threaded portion 48 may engage a threaded opening 54 of the proximal slider 34, and the second threaded portion 50 may engage a threaded opening 56 of the distal slider 36 to connect the shape memory material connecting member 38 to each of the proximal slider 34 and the distal slider 36.

The shape memory material connecting member 38 may be configured as a rod, e.g., a rod made of Nitinol (NiTi). However, the shape memory material connecting member 38 could have other shapes and configurations, and other superelastic materials (e.g., materials capable of exhibiting superelasticity and/or a temperature-induced shape changes) can be used to construct the shape memory material connecting member 38. Throughout this description, the shape memory material of the shape memory material connecting member 38 may be a metal alloy (e.g., Nitinol) or an elastic polymer (e.g., appropriately processed PEEK).

The surgical device 10 may additionally include a cable 60, which may be used as a tensioning device. The cable 60 may be attached to the distal slider 36 and extends to a location outside of the outer body 12. In an embodiment, the cable 60 is made of stainless steel, such as 304V Stainless Steel. The cable 60 may be received through a transverse passageway 58 of the distal slider 36.

In use, the cable 60 may be tensioned to move the distal slider 36 within the distal section 44 of the internal bore 40, thereby stretching the shaft 52 of the shape memory material connecting member 38 to a stretched position. Once stretched, the superelasticity of the shape memory material connecting member 38 urges the shaft 52 to want to return toward its unstretched position. The surgical device 10 can therefore apply a constant compression force across the bones of a joint once fixated therein.

Figure 3:
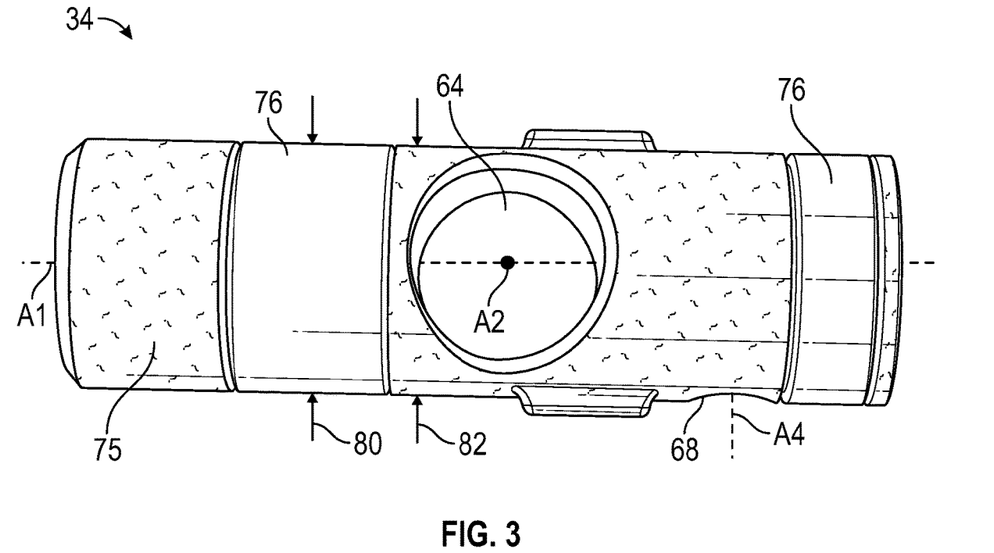
FIG. 3 illustrates a proximal slider of the slider assembly of the surgical device of FIGS. 1 and 2.
Figure 4:
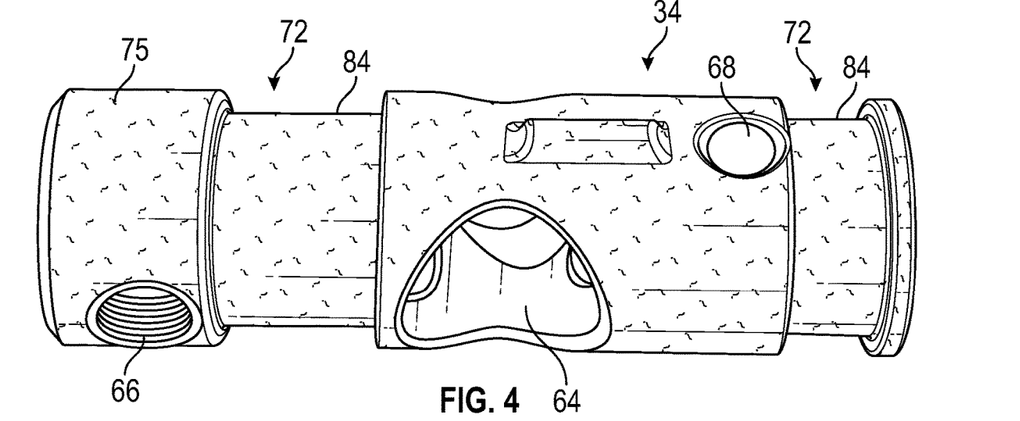
FIG. 4 illustrates the proximal slider of FIG. 3 with rings removed for illustrating indented sections of the proximal slider.

Additional details associated with the proximal slider 34 are illustrated in FIGS. 2, 3, and 4. The proximal slider 34 may include a threaded opening 54 extending along a first axis A1 and a non-threaded opening 64 extending along a second axis A2. In an embodiment, the second axis A2 is perpendicular to the first axis A1. The threaded opening 62 may receive a portion of the shape memory material connecting member 38 (see FIG. 2), and the non-threaded opening 64 may receive a screw (not shown) for fixating the surgical device 10 relative to one or more bones.

A second threaded opening 66 may extend along a third axis A3 that is parallel to the second axis A2. The second threaded opening 66 may receive a set screw 70 for maintaining a positioning of the first threaded portion 48 of the shape memory material connecting member 38 relative to the proximal slider 34.

A second non-threaded opening 68 may extend along a fourth axis A4 that is perpendicular to the first axis A1 and the second axis A2. The second non-threaded opening 68 may receive a pin, such as a PLLA pin, that can be press fit into place so the proximal slider 34 does not move before tensioning the cable 60.

The proximal slider 34 may include one or more indented sections 72 (best shown in FIG. 4). Each indented section 72 may be machined into the proximal slider 34, for example. The indented sections 72 establish areas of reduced diameter within the proximal slider 34.

Each indented section 72 may establish a cylindrical surface 84 for receiving a ring 76. One ring 76 may be affixed to the proximal slider 34 at each indented section 72. In an embodiment, each ring 76 is secured about the proximal slider 34 via an interference fit. Once secured, the ring 76 circumscribes the cylindrical surface 84 of the indented section 72 such that an outer diameter 80 of the ring 76 is slightly larger than an outer diameter 82 of the proximal slider 34 at locations adjacent to the indented section 72. The ring 76 therefore sits slightly proud of the outer diameter 82 of the proximal slider 34 when accommodated within one of the indented sections 72.

In an embodiment, the proximal slider 34 is made of a metallic material, such as a titanium alloy (e.g., Ti-6Al-4V), and each ring 76 is made of a thermoplastic material, such polyether ether ketone (PEEK). However, other materials could also be utilized. Each ring 76 establishes an interface between the proximal slider 34 and an inner wall 78 (see FIG. 2) of the proximal portion 14 of the outer body 12. The ring 76 may therefore function to substantially minimize or even prevent metal-to-metal contact between the proximal slider 34 and the outer body 12, thereby reducing wear particulate from forming during cycling and prolonging the operable life of the surgical device 10.

In the illustrated embodiment, the proximal slider 34 includes two indented sections 72 and two rings 76. However, a greater or fewer number of indented sections 72 and rings 76 could be provided on the proximal slider 34 within the scope of this disclosure. Moreover, the specific location of each indented section 72 and each ring 76 may vary and generally could be any location that does not interfere with components that interface with the proximal slider 34.

All or portions of the outer surface of the proximal slider 34 may be coated with a wear reducing coating 75. The wear reducing coating 75 may include titanium niobium nitride (TiNbN). However, other coatings may also be suitable.

Figure 5:
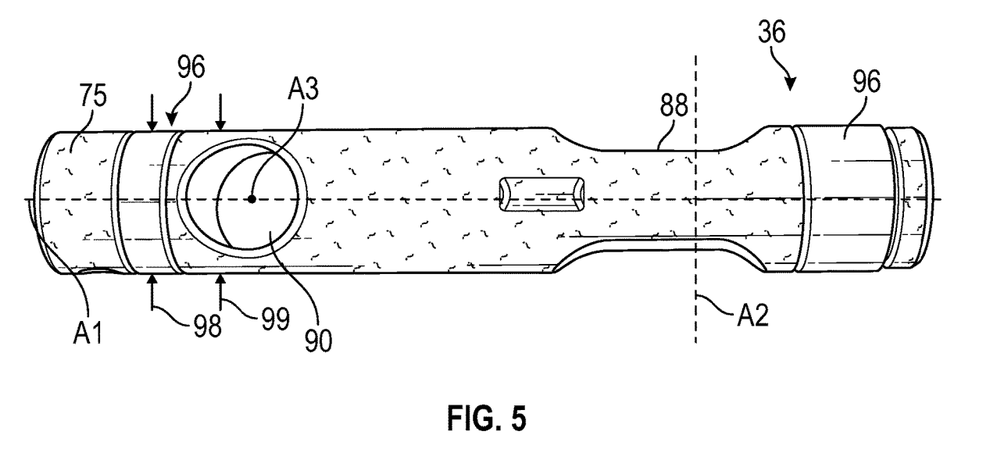
FIG. 5 illustrates a distal slider of the slider assembly of the surgical device of FIGS. 1 and 2.
Figure 6:
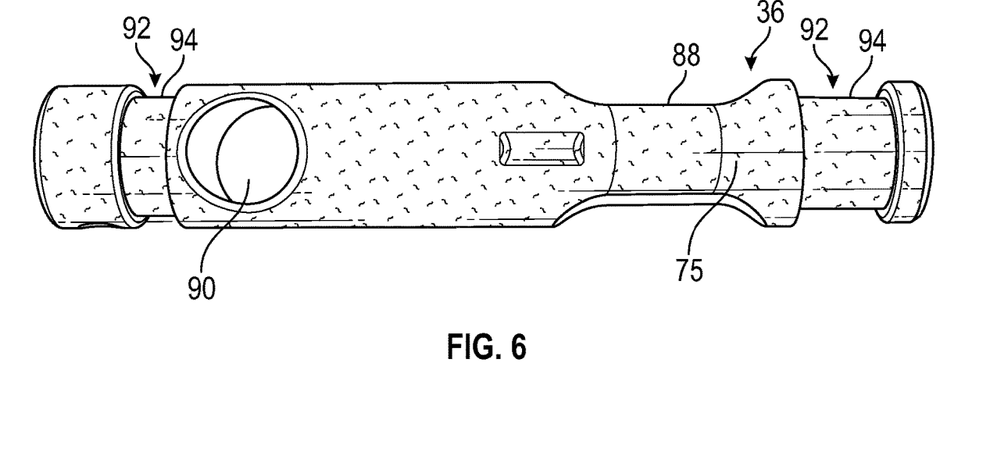
FIG. 6 illustrates the proximal slider of FIG. 5 with rings removed for illustrating indented section of the proximal slider.

Additional details associated with the distal slider 36 are illustrated in FIGS. 2, 5, and 6. The distal slider 36 may include the threaded opening 56 extending along a first axis A1, a first non-threaded opening 88 extending along a second axis A2, a second non-threaded opening 90 extending along a third axis A3, and the transverse passageway 58 extending along a fourth axis A4. In an embodiment, the second axis A2, the third axis A3, and the fourth axis A4 are each perpendicular to the first axis A1. In another embodiment, the second and fourth axes A2, A4 are parallel to one another but perpendicular to the third axis A3.

The threaded opening 56 may receive the second threaded portion 50 of the shape memory material connecting member 38, the first non-threaded opening 88 may receive a screw (not shown) that extends through the third distal opening 28 of the outer body 12, the second non-threaded opening 90 may receive a screw (not shown) that extends through the second distal opening 26 of the outer body 12, and the transverse passageway 58 may receive the cable 60 of the surgical device 10.

Similar to the proximal slider 34, the distal slider 36 may include one or more indented sections 92 (best shown in Figured 6). Each indented section 92 may be machined into the distal slider 36, for example. The indented sections 92 establish areas of reduced diameter within the distal slider 36.

Each indented section 92 may establish a cylindrical surface 94 for receiving a ring 96. One ring 96 may be affixed to the distal slider 36 at each indented section 92. In an embodiment, each ring 96 is secured to the distal slider 36 via an interference fit. Once secured, the ring 96 circumscribes the cylindrical surface 94 of the indented section 92 such that an outer diameter 98 of the ring 96 is slightly larger than an outer diameter 99 of the distal slider 36 at locations adjacent to the indented section 92. The ring 96 therefore sits slightly proud of the outer diameter 99 of the distal slider 36 when accommodated within one of the indented sections 92.

In an embodiment, the distal slider 36 is made of a metallic material, such as a titanium alloy (e.g., Ti-6Al-4V), and each ring 96 is made of a thermoplastic material, such polyether ether ketone (PEEK). However, other materials could also be utilized. Each ring 96 establishes an interface between the distal slider 36 and an inner wall 86 (see FIG. 2) of the distal portion 16 of the outer body 12. Each ring 96 may therefore function to substantially minimize or even prevent metal-to-metal contact between the distal slider 36 and the outer body 12, thereby reducing wear particulate from forming during cycling and prolonging the operable life of the surgical device 10.

In the illustrated embodiment, the distal slider 36 includes two indented sections 92 and two rings 96. However, a greater or fewer number of indented sections 92 and rings 96 could be provided on the distal slider 36 within the scope of this disclosure. Moreover, the specific location of each indented section 92 and each ring 96 may vary and generally could be any location that does not interfere with components that interface with the distal slider 36.

All or portions of the outer surface of the distal slider 36 may be coated with a wear reducing coating 75. The wear reducing coating 75 may include titanium niobium nitride (TiNbN). However, other coatings may also be suitable.

Figure 7:
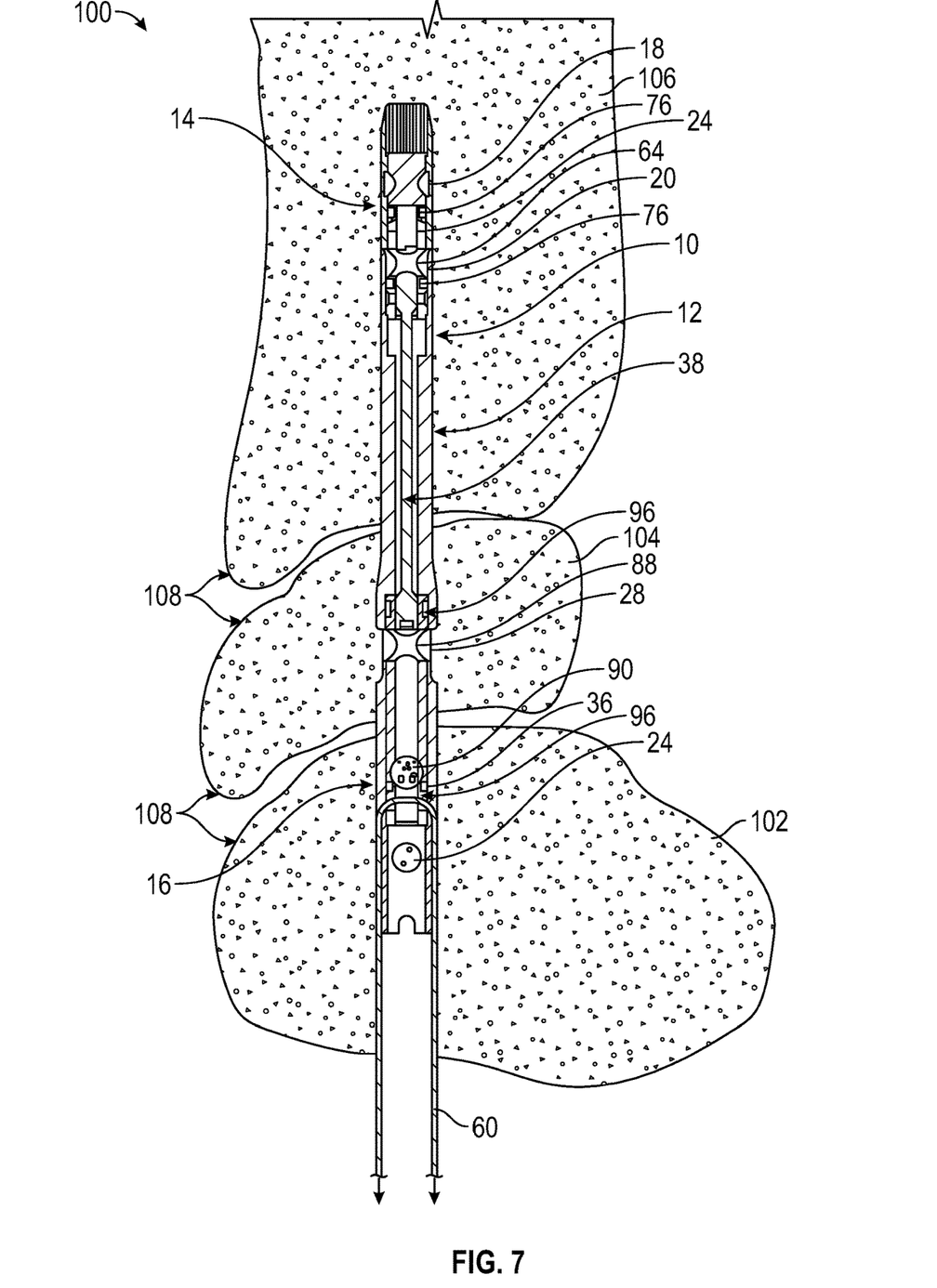
FIG. 7 illustrates an exemplary surgical use of the surgical device of FIGS. 1-2.

An exemplary use of the surgical device 10 as a tibio-talo-calcaneal (TTC) nail for use with a tibio-talo-calcaneal (TTC) joint 100 of an ankle is schematically illustrated in FIG. 7 (with continued reference to FIGS. 1-6). The TTC joint 100 includes a calcaneus 102, a talus 104, and a tibia 106. The TTC joint 100 can become unstable due to cartilage loss and/or diseased bone at articulating surfaces 108 of the calcaneus 102, the talus 104, and/or the tibia 106. Over time, a patient suffering from this instability can develop arthritis, thus resulting in significant pain. The surgical device 10 may therefore be used to fuse together the bones of the TTC joint 100, thereby causing the calcaneus 102, the talus 104, and the tibia 106 to act as a single bone and substantially eliminating motion and reducing pain caused by the arthritic joint. Although TTC joint fusions of the ankle are described herein as one example surgical technique the surgical device 10 could be used for, this disclosure is not intended to be limited to only TTC joint fusions.

During a surgical procedure, the surgical device 10 may be inserted into a reamed passage formed through the calcaneus 102, the talus 104, and portions of the tibia 106. Once received within the reamed passage, the proximal portion 14 of the outer body 12 extends into the tibia 106, and the distal portion 16 of the outer body 12 extends into both the calcaneus 102 and the talus 106.

A calcaneal screw (not shown) may be inserted through the first distal opening 24 of the outer body 12 to affix the surgical device 10 in place. A tibial screw (not shown) may then be inserted through the second proximal opening 20 of the outer body 12 and through the non-threaded opening 64 of the proximal slider 34. Insertion of the tibial screw substantially locks the proximal slider 34 from further movement relative to the outer body 12.

The cable 60 may then be tensioned, such as with a suitable tensioning device. Tensioning the cable 60 moves (e.g., slides) the distal slider 36 distally within the third distal opening 28. Since the proximal slider 34 is fixed from movement, distal movement of the distal slider 36 stretches the shape memory material connecting member 38 to generate a compressive load. The tension is held on the cable 60 while a talar screw is inserted through the third distal opening 28 of the outer body and through the first non-threaded opening 88 of the distal slider 36. An additional calcaneal screw may then be inserted through the second distal opening 26 of the outer body 12 and through the second non-threaded opening 90 of the distal slider 36.

Tension may then be released from the cable 60, and the cable may be removed. Releasing the tension on the cable 60 causes the shape memory material connecting member 38 to attempt to recover the strain caused by stretching the shape memory material connecting member 38 to the stretched position, thus creating and maintaining a compressive force across the bones of the TTC joint 100. If desired, an additional tibial screw may be inserted through the first proximal opening 18 of the outer body 12 to enhance fixation.

Throughout the procedure, the rings 76, 96 may contact the inner walls 78, 86 of the outer body 12, thereby limiting metal metal-to-metal contact between the proximal and distal sliders 34, 36 and the outer body 12. Wear particulate and resulting corrosion is therefore substantially reduced.

Additional embodiments of this disclosure include the provision and use of surgical devices configured as compression intramedullary (IM) nails, which may be manufactured from Titanium, stainless steel, or the like. Those IM nails may include shape memory materials (e.g., materials capable of exhibiting superelasticity and/or a temperature-induced shape change), which either pull or push locking screws together, and thereby effectively pulling or pushing bone fragments together.

Figure 8:
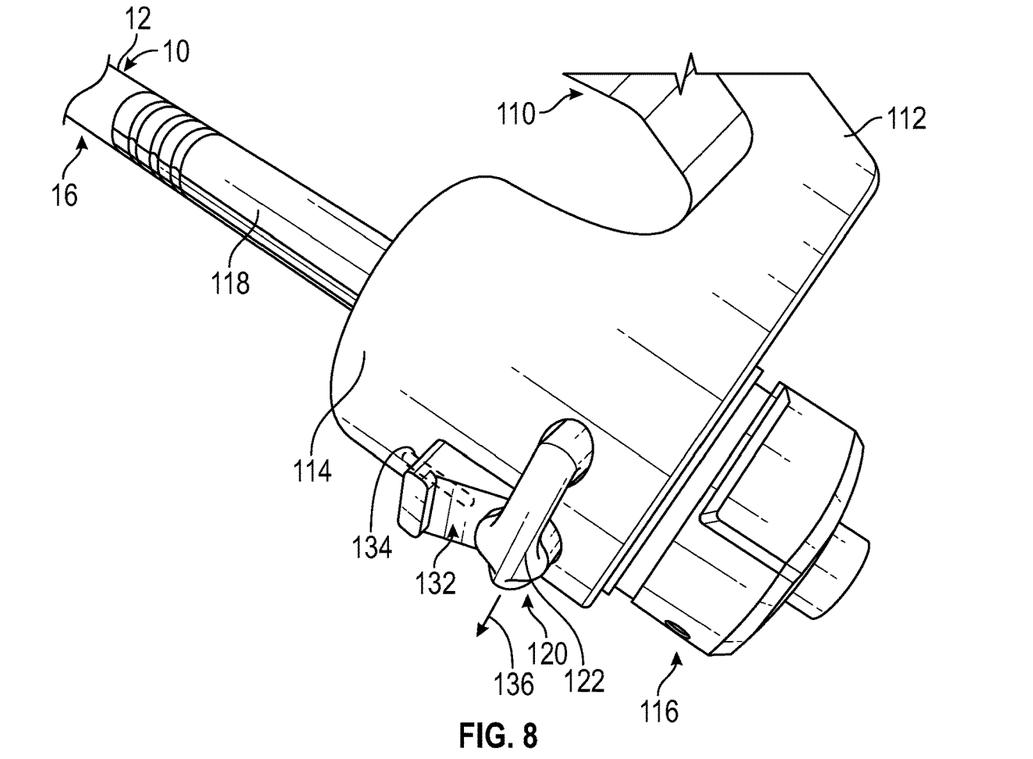
FIG. 8 illustrates a targeting guide for use with the surgical device of FIGS. 1-2.
Figure 9:
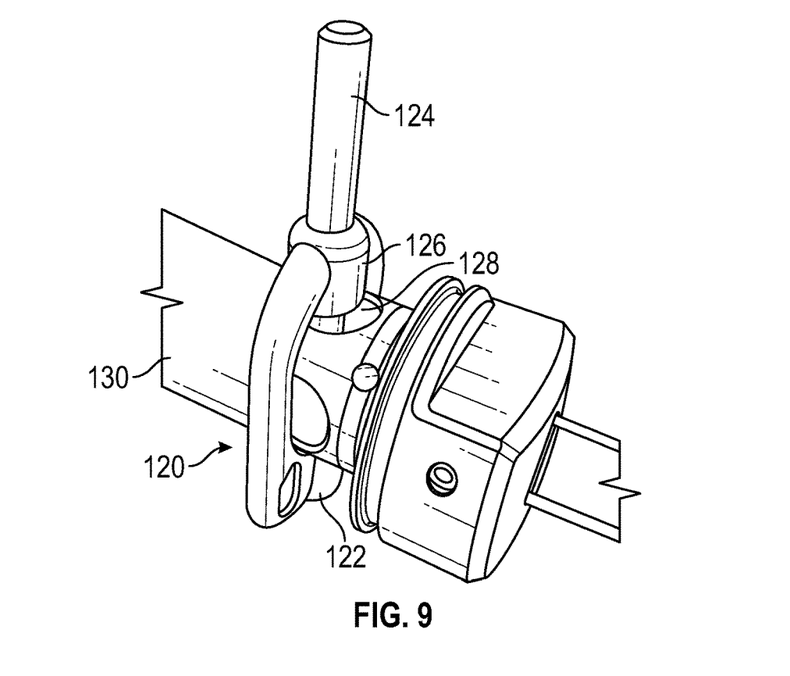
FIG. 9 illustrates an attachment arm and a rotation arrestor of the targeting guide of FIG. 8.

FIGS. 8 and 9 illustrate select portions of a targeting guide 110 that may be used to accurately align the surgical device 10 relative to a target implantation site. Accurate alignment of the surgical device 10 may be required for inserting various screws or other fasteners through the various openings of the surgical device 10, for example.

The targeting guide 110 may include a targeting arm 112 having a hub 114. An attachment arm 116 may be received through the hub 114. The attachment arm 116 may included an extension 118 configured to engage the distal portion 16 of the outer body 12 of the surgical device 10, such as for guiding the surgical device 10 into a reamed passage of one or more bones.

In order to maintain the surgical device 10 in the proper position for receiving screws and/or other fixation devices, rotation of the attachment arm 116 relative to the hub 114 should be limited. The targeting guide 110 may therefore include a rotation arrestor 120. The rotation arrestor 120 may include a retaining button 122 that is accessible outside of the hub 114. The retaining button 122 may be connected to a shaft 124 (see FIG. 9) that may be a least partially accommodated within a bore of the targeting arm 112. A peg 126 of the rotation arrestor 120 may selectively engage a hole 128 formed in a cylinder 130 of the attachment arm 116 for preventing rotation of the attachment arm 116 relative to the hub 114.

The targeting guide 110 may further include a spring loaded wedge 132 configured to selectively engage the retaining button 122. The spring loaded wedge 132 may slide along a track 134 formed in an outer surface of the hub 114. For example, the spring loaded wedge 132 may be moved into engagement with the retaining button 122 by sliding the spring loaded wedge 132 along the track 134. In an embodiment, the spring loaded wedge 132 is biased in a direction away from the retaining button 122.

As the spring loaded wedge 132 moves into further engagement with the retaining button 122, the retaining button 122 is forced to move in a radially outward direction 136 relative to the hub 114. Movement in the radially outward direction 136 causes the peg 126 to move into firmer engagement within the hole 128, thereby reducing tolerances and improving rotational stability and accuracy of the targeting guide 110.

This disclosure provides novel surgical devices capable of bringing bone or bone fragments into close proximity with each other, generating a compressive load, and maintaining the compressive load for a prolonged period of time while healing occurs. The inclusion of thermoplastic rings about portions of the sliders of the slider assembly limit or even prevent metal-to-metal contact, thereby improving functionality and operable life of the surgical device.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should further be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A surgical device, comprising:
a nail body extending along a longitudinal axis between a proximal portion and a distal portion;
a slider assembly including a proximal slider movably located within the proximal portion, a distal slider movably located within the distal portion, and a Nitinol rod connected to both the proximal slider and the distal slider;
a first ring received within a first indented section of the proximal slider; and
a second ring received within a second indented section of the distal slider,
wherein the proximal slider and the distal slider are comprised of a metallic material, and the first ring and the second ring are comprised of a thermoplastic material,
wherein the metallic material includes titanium, and the thermoplastic material includes polyether ether ketone (PEEK).

2. A surgical device, comprising:
a nail body extending along a longitudinal axis between a proximal portion and a distal portion;
a slider assembly including a proximal slider movably located within the proximal portion, a distal slider movably located within the distal portion, and a Nitinol rod connected to both the proximal slider and the distal slider;
a first ring received within a first indented section of the proximal slider; and
a second ring received within a second indented section of the distal slider,
wherein the proximal slider and the distal slider are comprised of a metallic material, and the first ring and the second ring are comprised of a thermoplastic material,
wherein the first ring circumscribes a cylindrical surface of the first indented section, and the second ring circumscribes a cylindrical surface of the second indented section.

3. A surgical device, comprising:
a nail body extending along a longitudinal axis between a proximal portion and a distal portion;
a slider assembly including a proximal slider movably located within the proximal portion, a distal slider movably located within the distal portion, and a Nitinol rod connected to both the proximal slider and the distal slider;
a first ring received within a first indented section of the proximal slider; and
a second ring received within a second indented section of the distal slider,
wherein the proximal slider and the distal slider are comprised of a metallic material, and the first ring and the second ring are comprised of a thermoplastic material,
wherein an outer diameter of the first ring is larger than an outer diameter of the proximal slider at a location adjacent to the first indented section, and an outer diameter of the second ring is larger than an outer diameter of the distal slider at a location adjacent to the second indented section.

4. A surgical device, comprising:
a nail body extending along a longitudinal axis between a proximal portion and a distal portion;
a slider assembly including a proximal slider movably located within the proximal portion, a distal slider movably located within the distal portion, and a Nitinol rod connected to both the proximal slider and the distal slider;
a first ring received within a first indented section of the proximal slider; and
a second ring received within a second indented section of the distal slider,
wherein the proximal slider and the distal slider are comprised of a metallic material, and the first ring and the second ring are comprised of a thermoplastic material,
wherein at least a portion of the proximal slider and the distal slider includes a wear reducing coating.

5. A surgical device, comprising:
an outer body;
a first slider received within the outer body;
a first ring that circumscribes an outer circumferential surface of the first slider and configured to reduce contact between the first slider and the outer body;
a second slider received within the outer body; and a second ring that circumscribes the outer circumferential surface of the second slider and configured to reduce contact between the second slider and the outer body.

6. The surgical device as recited in claim 5, wherein the first slider is comprised of a first material, and the first ring is comprised of a second material that is different from the first material, and further wherein the first material is a metallic material, and the second material is a thermoplastic material.

7. The surgical device as recited in claim 6, wherein the metallic material includes titanium, and the thermoplastic material includes polyether ether ketone (PEEK).

8. The surgical device as recited in claim 5, comprising a shape memory material connecting member connected to the first slider.

9. The surgical device as recited in claim 8, wherein the shape memory material connecting member is a Nitinol (NiTi) rod.

10. The surgical device as recited in claim 8, wherein the shape memory material connecting member is connected to the second slider, and further comprising a third ring disposed about the second slider and configured to reduce contact between the second slider and the outer body.

11. The surgical device as recited in claim 5, wherein the first ring is received about an indented section of the first slider.

12. The surgical device as recited in claim 11, wherein the first ring circumscribes a cylindrical surface of the indented section.

13. The surgical device as recited in claim 5, comprising a tensioning device connected to the first slider.

14. The surgical device as recited in claim 13, wherein the tensioning device is a cable received through a transverse passageway of the first slider.

15. The surgical device as recited in claim 5, wherein the first ring is received about a first indented section of the first slider, and the second ring is received about a second indented section of the second slider, and further wherein the first ring includes a first size that is different from a second size of the second ring.

16. A surgical device, comprising:
an outer body;
a first slider received within the outer body; and
a first ring that circumscribes an outer circumferential surface of the first slider and configured to reduce contact between the first slider and the outer body,
wherein the first ring includes an outer diameter that is larger than an outer diameter of the first slider.

17. A surgical device, comprising:
an outer body;
a first slider received within the outer body; and
a first ring that circumscribes an outer circumferential surface of the first slider and configured to reduce contact between the first slider and the outer body,
wherein the outer body is connectable to a targeting guide that includes a targeting arm having a hub.

18. The surgical device as recited in claim 17, wherein the targeting guide includes a rotation arrestor having a retaining button, and a spring loaded wedge is configured to selectively engage the retaining button.

19. A surgical device, comprising:
a nail body extending along a longitudinal axis between a proximal portion and a distal portion;
a slider assembly including a proximal slider movably received within the proximal portion, a distal slider movably received within the distal portion, and a shape memory alloy rod connected to the proximal slider and the distal slider;
a first ring received about a first outer circumferential surface of a first indented section of the proximal slider and arranged to reduce contact between the proximal slider and the nail body; and
a second ring received about a second outer circumferential surface of a second indented section of the distal slider and arranged to reduce contact between the distal slider and the nail body,
wherein the proximal slider and the distal slider are each comprised of a metallic material,
wherein the first ring and the second ring are each comprised of a thermoplastic material that includes polyether ether ketone (PEEK).

* * * * *